(12) United States Patent
Kawase et al.

(10) Patent No.: US 9,569,019 B2
(45) Date of Patent: Feb. 14, 2017

(54) ADAPTIVE TOUCH PANEL DISPLAY

(71) Applicant: International Business Machines Corporation, Armonk, NY (US)

(72) Inventors: Takaaki Kawase, Tokyo (JP); Satoko Kinoshita, Yokohama (JP); Yoshio Horiuchi, Kanagawa-ken (JP); Daisuke Maruyama, Kanagawa-ken (JP); Tetsuya Yanagawa, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 13/685,858

(22) Filed: Nov. 27, 2012

(65) Prior Publication Data

US 2013/0141367 A1 Jun. 6, 2013

(30) Foreign Application Priority Data

Dec. 1, 2011 (JP) .................. 2011-264133

(51) Int. Cl.
*G06F 3/041* (2006.01)

(52) U.S. Cl.
CPC ............. *G06F 3/041* (2013.01); *G06F 3/0412* (2013.01); *G06F 3/0416* (2013.01)

(58) Field of Classification Search
CPC ....................................................... G06F 3/041
USPC .................................................. 345/173–179
See application file for complete search history.

(56) References Cited

U.S. PATENT DOCUMENTS

| | | | |
|---|---|---|---|
| 5,724,069 A * | 3/1998 | Chen ............................ 345/172 |
| 2002/0191029 A1* | 12/2002 | Gillespie et al. ............. 345/810 |
| 2008/0150911 A1 | 6/2008 | Harrison | |
| 2009/0153438 A1* | 6/2009 | Miller et al. .................... 345/55 |

FOREIGN PATENT DOCUMENTS

| | | |
|---|---|---|
| JP | 8190456 A | 7/1996 |
| JP | 2000330711 A | 11/2000 |
| JP | 2004152217 A | 5/2004 |
| JP | 2004532477 A | 10/2004 |
| JP | 2010039614 A | 2/2010 |
| JP | 2011510403 A | 3/2011 |

* cited by examiner

*Primary Examiner* — Alexander Eisen
*Assistant Examiner* — Cory Almeida
(74) *Attorney, Agent, or Firm* — Cantor Colburn LLP; William Hartwell

(57) ABSTRACT

An aspect of the invention includes a display device that operates controls on a display surface independent of a size of the display surface. A touch panel displays a screen on a display surface and inputs a user operation point on the display surface. An extracting part extracts controls that receive a touch operation of a user from content to be displayed on the display surface. A display controller displays auxiliary buttons for providing instructions for input of an extracted control, together with the content on the display surface.

17 Claims, 14 Drawing Sheets

ADAPTIVE TOUCH PANEL DISPLAY

PRIORITY

The present application claims priority to Japanese Patent Application No., 2011-264133, filed Dec. 1, 2011, and all the benefits accruing therefrom under 35 U.S.C. §119, the contents of which in its entirety are herein incorporated by reference.

BACKGROUND

The present invention relates to a display device, display method, and program.

Conventionally, devices provided with a touch panel display, operating buttons, or the like on the display surface of the touch panel, as well as operations corresponding to those operating buttons, are executed by detecting that a user has touched a display position associated with the operating button.

Examples of such devices may be found in Japanese Unexamined Patent Publication No. H8-190456, Japanese Unexamined Patent Publication No. 2000-330711, Japanese Unexamined Patent Publication No. 2004-152217, Japanese Unexamined Patent Publication No. 2010-39614, and Japanese Translation of PCT Application No. 2011-510403.

SUMMARY

According to one embodiment, a display device is provided. The display device includes a touch panel that displays a screen on a display surface and inputs a user operation point on the display surface. The display device also includes an extracting part that extracts controls that receive a touch operation of a user from content to be displayed on the display surface. The display device further includes a display controller that displays auxiliary buttons for providing instructions for input of an extracted control, together with the content on the display surface.

According to another embodiment, a display device is provided. The display device includes a touch panel with a display surface and a display controller that displays controls on the display surface. The display controller also displays auxiliary buttons that call out functions that are the same as functions of the controls on edge parts of the display surface.

According to a further embodiment, a display method is provided. The method includes displaying content on a display surface, inputting user operation points on the display surface, and extracting controls that receive touch operations of a user from the content to be displayed on the display surface. The method also includes displaying auxiliary buttons for providing instructions for input to an extracted control, together with the content on the display surface.

According to yet another embodiment, a computer program product is provided. The computer program product includes a computer readable storage medium having computer readable program code embodied therewith. The computer readable program code is configured to perform a method. The method includes displaying content on a display surface of a display device, inputting user operation points on the display surface, and extracting controls that receive touch operations of a user from the content to be displayed on the display surface. The method also includes displaying auxiliary buttons for providing instructions for input to an extracted control, together with the content on the display surface.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

When the size of a display surface of a touch panel is relatively small compared to the size of a finger of the user, the display surface is often hidden from view by the finger that operates the device. In this instance, confirming the operating button or the like while operating can be difficult. Furthermore, the operating button to be operated may be displayed smaller than the fingers, and in this case, the operation itself is difficult. Furthermore, if the size of the display surface of the touch panel is large compared to the fingers or the like of the user, the fingers that touch the display surface must be moved across a large distance, and thus the operation may be difficult.

An embodiment of the invention provides a display device containing a touch panel that inputs an operation point of a user on a display surface and displays a screen on the display surface. The display device also includes an extracting part for extracting controls that receive a touch operation by the user from contents displayed on the display screen, and a display control part that displays auxiliary buttons for indicating input to the extracted controls together with content on the display screen. This embodiment also provides a display method and a program for the device. These, and other embodiments, will now be described.

Figure 1:
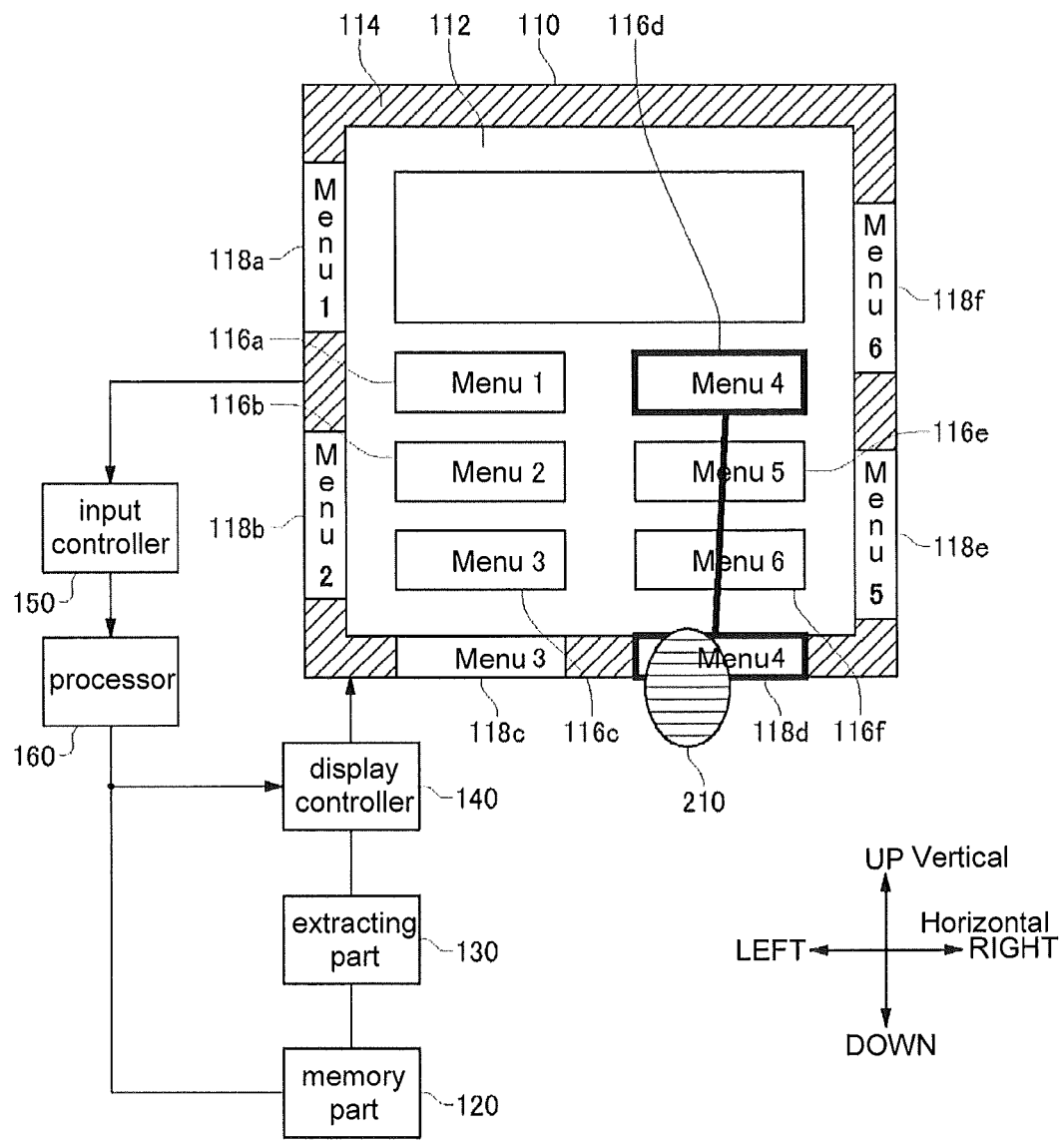
FIG. 1 illustrates a configuration example of a display device according to an embodiment.

FIG. 1 illustrates a configuration example of a display device 100 according to an embodiment. The display device 100 selects and determines controls or components such as operating buttons or the like based on a user operating edge parts of the touch panel. The display device 100 can be incorporated in mobile phone devices, mobile information terminal devices, and electronic devices that have a touch panel and the like, and in this case, a process is executed by the device based on operations by the user. The display device 100 contains a touch panel 110, a memory part 120, an extracting part 130, a display controller 140, an input controller 150, and a processor 160.

The touch panel 110 has a display surface 112, and displays a screen on the display surface 112 and inputs the operation point of the user on the display screen 112. The touch panel 110 has a display part such as a liquid crystal panel for example, and a touch position detecting part such as a touch sensor or the like, and detects the position on the display part that the user has touched. The touch panel 110 detects actions where the user moves a finger or the like in proximity to the display part, actions of touching the display part, actions of touching the display part for longer than a predetermined period of time, actions of touching and sliding across the display part, and/or actions of removing the finger or the like that has been touching the display part.

The display surface displays content that includes controls 116, text, images, and/or video and the like. The display surface 112 may also display enlargements or reductions based on the screen size of the content being displayed. Alternatively, the display surface 112 may display all or a portion of the content and, in this case, a scrollbar or a slider that can indicate enlargement or reduction can be displayed along with the content. The display surface 112 can be square, or alternatively can be elliptical, round, oval, or polygonal-shaped, or the like.

The display surface 112 displays as controls for inputting user operations various graphical user interface components such as buttons that perform an operation such as pushbuttons, radio buttons where one of a plurality of options is selected, checkboxes where one or more of a plurality of options can be selected, sliders that move when a button or the like is moved in a straight line, spin buttons that support number input, scrollbars, list boxes, drop-down lists, menus, toolbars, icons, text boxes, and the like. The display surface 112 is an example where the controls 116a through 116f are displayed as six pushbuttons. The display surface 112 includes edge parts 114.

The edge parts 114 are touch position detecting parts provided with a predetermined width in a region of at least one an edge part on the top, bottom, left, or right of the display surface 112. The edge part 114 can be touch position detecting parts that correspond to a region of several dots on the display surface 112. The edge parts 114 are auxiliary operating regions where the user actually operates the touch panel 110.

The diagram illustrates an example where the edge parts 114 include all four edges of a square display surface 112, but as an alternative, the edge parts 114 can be on an edge of one or more sides of the display surface 112. Furthermore, the edge parts 114 can be on a portion of a side edge. The edge part 114 displays auxiliary buttons 118 where the user operates the touch panel 110.

With the aforementioned touch panel 110, the user operates controls 116 on the display surface 112 by touching a finger onto a region where the auxiliary button 118 is displayed on the edge part 114. An operating point 210 is shown as an example of an operating point where a user input is detected on the edge part 114 in the diagram.

The memory part 120 stores content to be displayed on the display screen 112 and a program or the like that is executed by the display device 100. The memory part 120 can store content or the like acquired by the display device 100 from a network such as the Internet or the like.

The extracting part 130 extracts controls 116 that receive user touch operations from the content displayed on the display surface 112. In FIG. 1, the extracting part 130 extracts information such as the type, label, size, and/or position or the like of the controls 116a through 116f from the content displayed on the display surface 112. The extracting part transmits the extracted information to a display controller 140.

The display controller 140 causes the display surface 112 to display the auxiliary buttons 118 for guiding input to the controls 116 extracted by the extracting part 130, along with the content. In an embodiment, the display controller 140 displays the auxiliary buttons 118 on the edge parts 114 of the display surface 112. In FIG. 1, the display controller 140 displays auxiliary buttons 118a through 118f based on information from the controls 116a through 116f extracted by the extracting part 130, along with the corresponding content on the display surface 112.

In an embodiment, the display controller 140 places the auxiliary buttons 118 at positions separated by at least a predetermined distance from the display position of the plurality of controls 116 on the display surface 112. Furthermore, the touch panel 110 can invalidate input to the controls 116 by the user if the controls 116 are placed on the edge part 114 of the display surface 112.

Alternatively, the extracting part 130 is not required to extract controls 116 that are placed on the edge parts 114 of the display surface 112. Therefore, the touch panel 110 can prevent touch input to an auxiliary button 118 by the user from inadvertently being input as touch input to the controls 116.

The display controller 140 displays the auxiliary buttons 118 on the display surface 112, corresponding to the controls 116, on a one-to-one basis. In an embodiment, the display controller 140 can clarify and display the associations between the auxiliary buttons 118a through 118f and the corresponding controls 116a through 116f. For example, if labels are applied to the controls 116 and the labels are also displayed on the display surface 112, the display controller 140 can display the labels together with the corresponding auxiliary button. Alternatively, the display controller 140 can display the auxiliary buttons 118 as essentially the same color as the color that the corresponding control 116 is displayed on the display surface 112.

The input controller 150 guides input to the corresponding controls 116 based on the operation of the auxiliary buttons 118 by the user. The input controller 150 receives from the touch panel 110 information that indicates a user has operated the auxiliary buttons 118. The input controller 150 transmits the information of the corresponding controls 116 to the processor 160. In the example shown in the diagram, the input controller 150 transmits the information of the corresponding control 116d to the processor 160 based on the operation of the auxiliary button 118d when the user touches and inputs the operation point 210, and thus guides the input of the controls 116d.

The processor 160 receives the information of the control 116 that was transmitted by the input controller 150, and executes the control 116 on the content displayed on the display surface 112 as user input. In FIG. 1, the processor 160 executes the control 116d based on information of the control 116d received from the input controller 150. In an embodiment, if the display device 100 is incorporated into an electronic device or the like, the processor 160 can instruct the device to execute the control 116.

Furthermore, the processor 160 executes a predetermined program and displays the content corresponding to the program on the display surface 112. In an embodiment, the processor 160 can display content from a network such as the Internet or the like on the display surface 112 based on designation by the user or execution of a preestablished program. The processor 160 can transmit the information to be displayed to a display controller 140 so that the content is displayed on the display surface 112.

Figure 2:
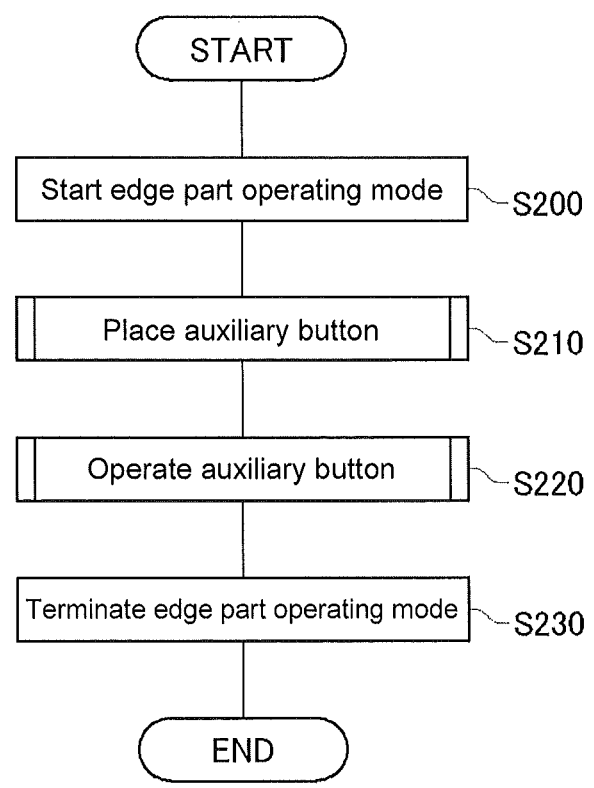
FIG. 2 shows operation flow of a display device according to an embodiment.

FIG. 2 shows the operation flow of a display device 100 according to an embodiment. If control 116 is included in the content displayed in the display surface 112, the display device 100 will start in edge part operating mode (S200). Alternatively, the display device 100 can start in edge part operating mode if it is detected that the user touches the touch panel 110, the display device 100 is moved and subjected to acceleration, or the display device 100 is moved at an angle or the like. In this case, the display device 100 also has a detecting part that detects user movement input.

The display controller 140 places auxiliary buttons 118 on the display surface 112 (S210). Note that the operation flow for placing the auxiliary button 118 is described in detail in FIG. 3. The input controller 150 transmits the information for the corresponding control 116 to the processor 160 based on the operation of the auxiliary button 118 by the user (S220). Note that the operation flow for operating the auxiliary buttons 118 is described in detail in FIG. 4.

The display device 100 terminates edge part operating mode after the information of the control 116 is transmitted to the processing part 160 by the input controller 150 (S230). In an embodiment, if the control 116 displayed on the display surface 112 has a plurality of user inputs, the display device 100 can start in edge part operating mode.

Figure 3:
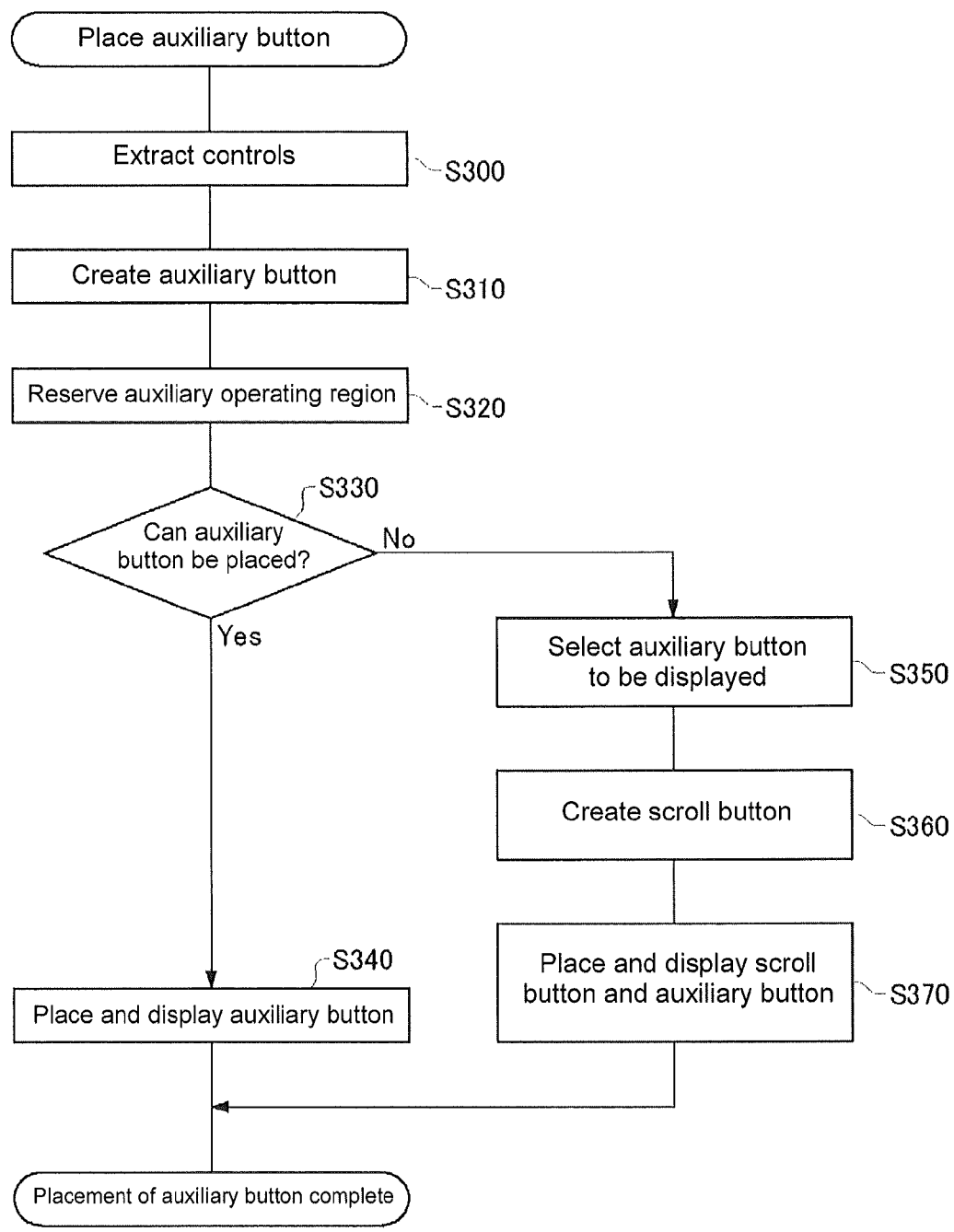
FIG. 3 shows operation flow for placement of auxiliary buttons on a display device according to an embodiment.

FIG. 3 shows the operation flow for placement of auxiliary buttons 118 on a display device 100 according to an embodiment. The extracting part 130 extracts controls 116 from the content to be displayed on the display surface 112 (S300). The extracting part 130 can extract the controls 116 from the content displayed in the display surface 112, but alternatively, can extract the controls 116 including a portion that are not displayed in the display surface 112.

The extracting part 130 analyzes a program executed by the display device 100 and extracts the controls 116 from the source code of the contents. Alternatively the extracting part 130 extracts the controls 116 from the image information of the content. In this case, the extracting part 130 can extract the controls 116 for the image information that analyzes changes in the content for the case where all of the dots of the image information to be displayed as content are click operated.

Alternatively, the extracting part 130 receives information for the controls 116 from an application that displays content. The extracting part 130 can receive the information of the controls 116 directly from the application. In this case, the application is programmed beforehand to transmit information for the control 116 to the extracting part 130.

The display controller 140 creates auxiliary buttons 118 (S310). The display controller 140 can create the auxiliary buttons 118 at a predetermined size or the like for the controls 116 on a one-to-one basis. For example, the display controller 140 makes the auxiliary buttons 118 rectangular, and provides a label that is displayed by a text string or an icon or the like.

The display controller 140 reserves auxiliary operating regions for placing auxiliary buttons 118 on the edge parts 114 of the display surface 112 (S320). In an embodiment, the auxiliary operating regions can be preestablished regions. The auxiliary operating regions can be the same region as the edge parts 114 of the display surface 112.

The display controller 140 confirms whether or not all of the auxiliary buttons 118 can be placed in the auxiliary operating regions that are reserved (S330). For example, the display control part 140 compares the area of the auxiliary operating regions and the area of the auxiliary buttons 118, and confirms whether or not all of the auxiliary buttons 118 can be placed. If all of the auxiliary buttons 118 can be placed, the display controller 140 causes the auxiliary buttons 118 to be arranged and displayed on the display surface 112 (S340).

The display controller 140 can arrange the auxiliary buttons 118 to be in proximity to the corresponding controls 116. Alternatively, the corresponding auxiliary buttons 118 can be arranged in the order that the controls 116 are arranged on the display surface 112. For example, the display controller 140 places the corresponding auxiliary buttons 118 in the order that the controls 116 are aligned in the row direction or the column direction from the top of the display surface 112. Alternatively, if labels of text strings are displayed on the controls 116, the display controller 140 can place the corresponding auxiliary buttons 118 in phonetic order or alphabetical order of the text strings.

If all of the auxiliary buttons 118 cannot be placed, the display controller 140 selects which auxiliary buttons 118 will be displayed on the display surface 112 (S350). The display controller 140 can select the corresponding auxiliary button 118 based on the order that the controls 116 are aligned on the display surface 112. Alternatively, if labels of text strings are displayed on the controls 116, the display controller 140 can select the corresponding auxiliary buttons 118 in phonetic order or alphabetical order of the text strings.

Alternatively, the display controller 140 records the number of times that each control 116 is operated, and can select the auxiliary buttons 118 corresponding to the order of the largest number of times that each control is operated. In this case, the display controller 140 can update the selection of the auxiliary buttons 118 each time a control 116 is operated.

The display controller 140 creates a scroll button (S360). The display controller 140 creates the scroll button on the edge parts 114 if all of the auxiliary buttons 118 cannot be placed. The display controller 140 causes the auxiliary buttons 118 and the scroll buttons to be placed and displayed on the display surface 112.

As an example, the case is described where the display device 100 has auxiliary operating regions on the left and right edge parts 114 of the display surface 112, and can display two auxiliary buttons 118 on one edge part 114. The display controller 140 determines that all of the auxiliary buttons 118 cannot be displayed on the two edge parts 114, based on the extraction results that six controls 116a through 116f are included in the content, as illustrated in FIG. 1.

Therefore, the display controller 140 determines that the left column controls 116a through 116c should be displayed on the left edge part 114, and the right column controls 116d through 116f should be displayed on the right edge part 114, and selects auxiliary buttons 118*a* and 118*b* corresponding to controls 116*a* and 116*b* to be on the left edge part 114. Furthermore, auxiliary buttons 118*d* and 118*e* corresponding to controls 116*d* and 116*e* are selected for the right edge part 114.

Furthermore, the display controller 140 places and displays auxiliary buttons 118*a*, 118*b* as well as a scroll button on the left edge part 114. In addition, the display controller 140 places and displays auxiliary buttons 118*d*, 118*e*, as well as a scroll button on the right edge part 114. In this manner, the display controller 140 completes placement of the auxiliary buttons 118 (S310).

Figure 4:
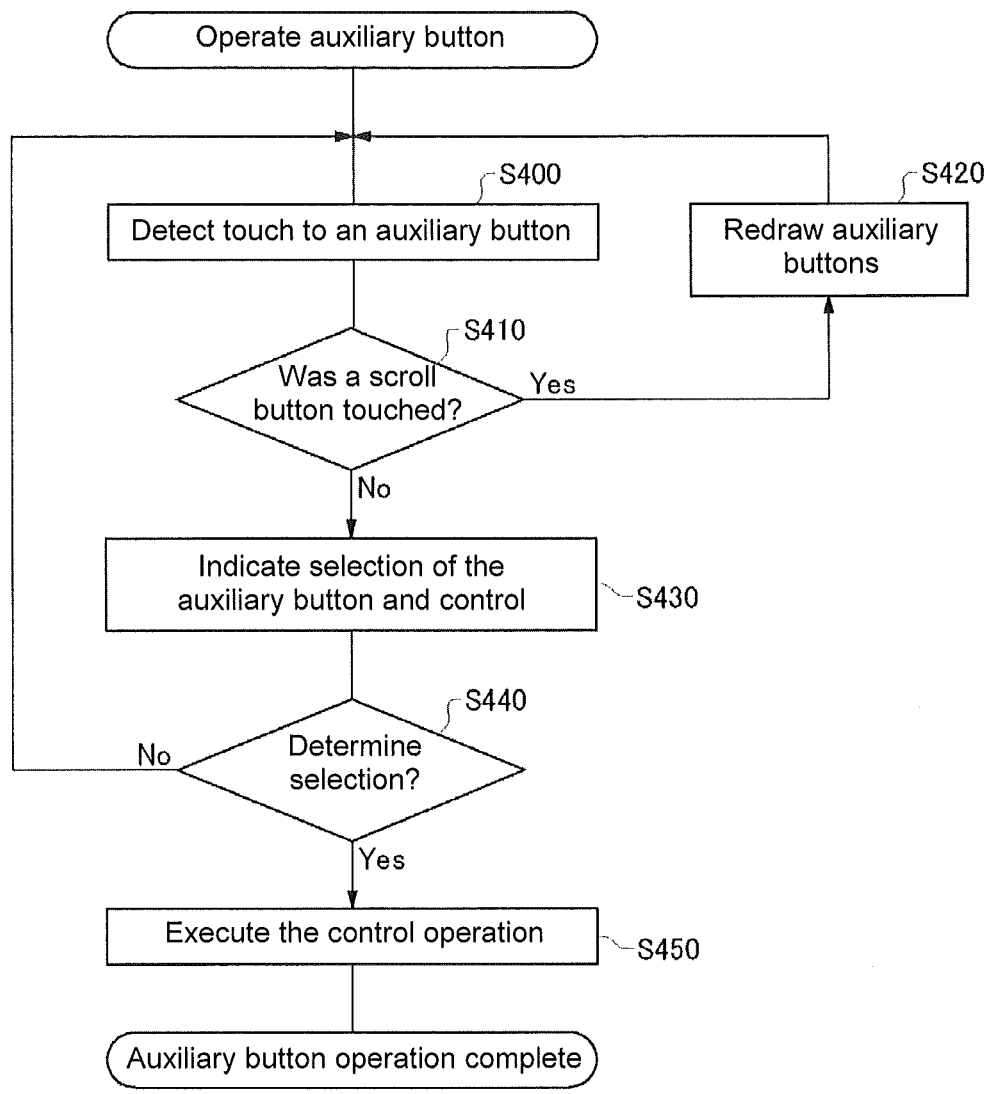
FIG. 4 shows operation flow for operation of auxiliary buttons on a display device according to an embodiment.

FIG. 4 shows the operation flow for operation of auxiliary buttons 118 on a display device 100 according to an embodiment. The touch panel 110 detects a touch input of the auxiliary button 118 by the user (S400). When the touch input is detected, the touch panel 110 transmits information for the auxiliary button 118 that has been touch input by the user to the input controller 150.

The input controller 150 determines whether or not the user has touched the scroll button (S410). In other words, the input controller 150 determines whether or not the auxiliary button 118 that was touch input by the user is a scroll button, based on the information of the auxiliary button 118 received from the touch panel 110. In an embodiment, the input controller 150 receives and stores the types of auxiliary buttons 118 from the display controller 140 before hand.

If the auxiliary button 118 that is touch input by the user is a scroll button, the input controller 150 transmits instructions to scroll the edge parts 114 of the display surface 112 where the auxiliary buttons 118 are displayed. The processor 160 redraws the auxiliary buttons 118 on the corresponding edge part 114 of the display surface 112 via a display controller 140 (S420). The display device 100 returns to step S400, and detects touch input by the user of the auxiliary buttons 118 on the touch panel 110.

If the auxiliary button 118 that is touch input by the user is not a scroll button, the input controller 150 transmits instructions to indicate selection of the auxiliary button 118 and the corresponding control 116 (S430). The processor 160 indicates selection of the auxiliary button 118 and the control 116 on the edge part 114 of the display surface 112 via a display controller 140.

The display controller 140 indicates selection of the auxiliary button 118*d* and the corresponding control 116*d* corresponding to the auxiliary button 118*d* that was touch input by the user as illustrated in FIG. 1. The display controller 140 can change the display color of the auxiliary button 118 and the corresponding control 116 to indicate selection, or can change the size and display the auxiliary button 118 and the corresponding control 116.

Alternatively, the display controller 140 can cause the auxiliary button 118 and the corresponding control 116 to flash. Furthermore, the display controller 140 can display a line that connects between the auxiliary button 118*d* and the corresponding control 116*d*.

The input controller 150 instructs the processor 116 to input control 116 based on the confirmation of selection of the auxiliary button 118 by the user (S440). Furthermore, if selection of the auxiliary button 118 is canceled by the user, the input controller 150 returns to step S400, and causes the touch input of the auxiliary button 118 by the user to be detected by the touch panel 110. In an embodiment, the input controller 150 can determine whether selection of the auxiliary button 118 has been confirmed or selection has been canceled based on the user inputting a preestablished action.

The input controller 150 determines whether selection of the auxiliary button 118 has been confirmed or canceled based on the touch panel 110 detecting an action such as a second touch input after removing contact with the auxiliary button 118, or continuing to touch the auxiliary button 118 for a time that is longer than a preestablished time, or by the user removing contact with the area of the auxiliary button 118 that was touched, for example. The processor 160 executes the operation corresponding to the control 116 that was confirmed, and complete the operation of the auxiliary button 118 (S450).

With the display device 100 of the aforementioned embodiment, the controls 116 displayed in the center part excluding the edge parts 114 on the display surface 112 can be performed by the user operating the edge parts 114 on the display surface 112 of the touch panel 110. Thereby, even if the display surface 112 of the display device 100 is small compared to the finger of the user, for example, the user can view the center part excluding the edge parts 114 on the display surface 112 while operating the controls 116.

Furthermore, even if the controls 116 displayed by the display surface 112 are small compared to the finger of the user, for example, the user can easily operate the controls 116 to be input. In addition, even if the display surface 112 of the display device 100 is large compared to the finger of the user for example, the user can easily operate the control 116 to be input by operating the edge parts 114 of the display surface 112 even though the controls 116 are distributed and placed across a broad area.

Figure 5:
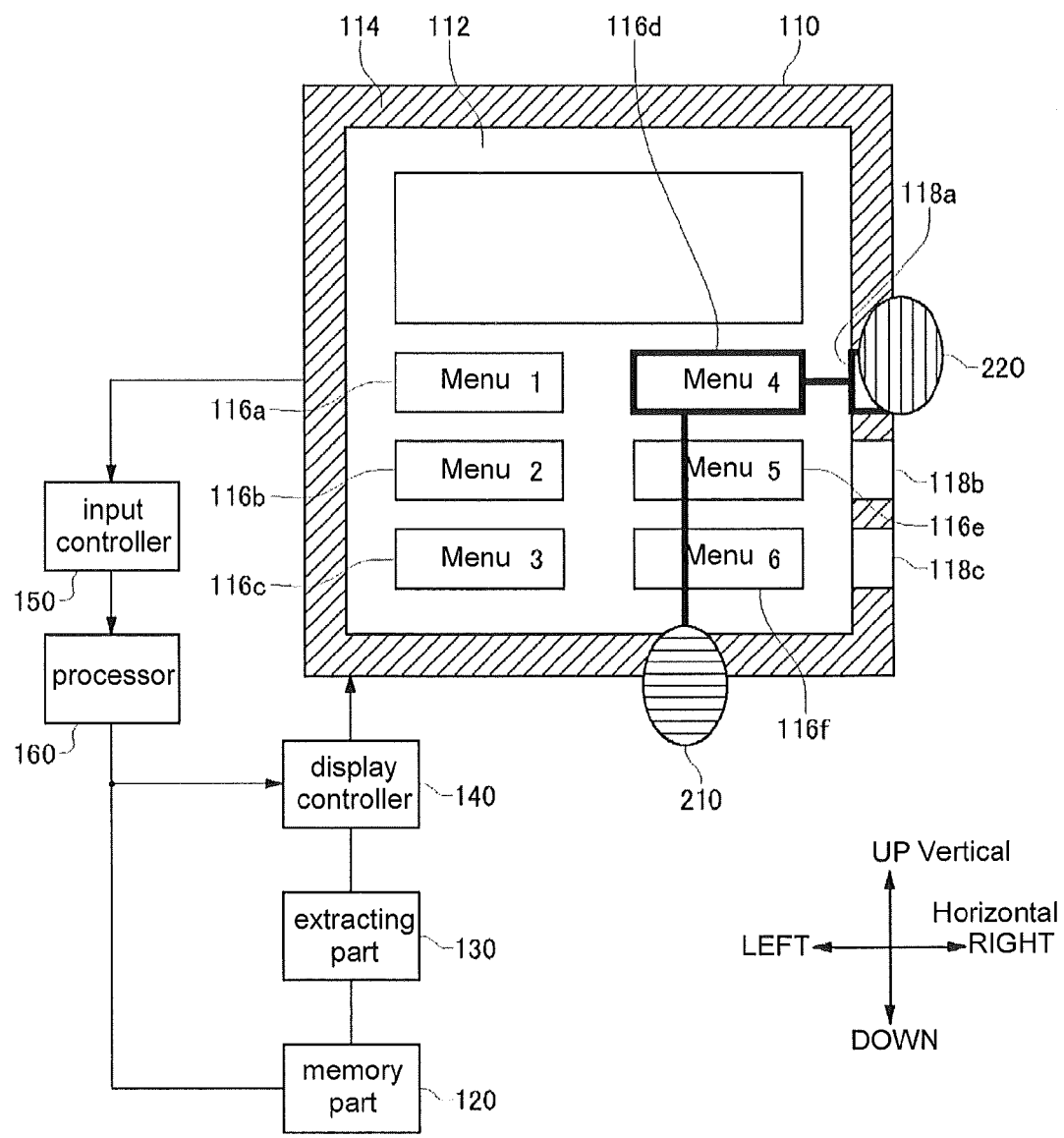
FIG. 5 illustrates a first alternate example of a display device according to an embodiment.

FIG. 5 illustrates a first alternate example of a display device 100 according to an embodiment. With a display device 100 according to an alternate example, actions that are essentially identical to the actions of the display device 100 according to the embodiment illustrated in FIG. 1 have been assigned the same code, and a description has been omitted. In FIG. 5, the controls 116 on the display surface 112 are operated by the user touching a finger to the edge part 114, for example. A first operation point 210 and a second operation point 220 are illustrated on the edge parts 114 in FIG. 5 as examples of operation points where the input of the user has been detected.

In this alternate example, the extracting part 130 extracts row and column arrangement information of the controls 116 on the display surface 112. In the example illustrated in FIG. 5, the extracting part 130 can extract identically shaped controls 116*a* through 116*f* by arranging in three rows of two columns.

The display controller 140 arranges the auxiliary buttons 118 in the horizontal direction and the vertical direction of the display surface 112 based on the rows and columns of the controls 116. With the example illustrated in FIG. 5, the display controller 140 arranges three auxiliary buttons 118*a* through 118*c* on an edge part 114 in the vertical direction of the display surface 112 based on the arrangement of the three rows of controls 116*a* through 116*f*. Alternatively, the display controller 140 arranges two auxiliary buttons 118*a* and 118*b* on an edge part 114 in the horizontal direction of the display surface 112, based on the arrangement of the two columns of controls 116*a* through 116*f*.

The input controller 150 guides input to the controls 116 located in rows and columns based on the auxiliary button 118 that was operated by the user. With the example illustrated in FIG. 5, the input controller 150 determines that the user has selected the column where controls 116*d* through 116*f* are aligned based on the first operation point 210 touch input by the user. The input controller 150 instructs the processor 160 to input control 116*d* corresponding to auxiliary button 118a located in the column where controls 116d through 116f are aligned, based on the user touch inputting the auxiliary button 118a.

In this manner, the input controller 150 detects the selection of the controls 116 in the column direction based on the touch input by the user on the edge part 114 on the top or bottom side of the display surface 112, and then instructs input of the corresponding control 116 based on the touch input by the user on the auxiliary button 118 shown on the edge part 114 on the right and/or left side of the display surface 112. Alternatively, the input controller 150 detects the selection of the control 116 in the row direction based on the touch input by the user on the edge part 114 on the left or right side of the display surface 112, and then instructs input of the corresponding control 116 based on the touch input by the user on the auxiliary button 118 shown on the edge part 114 on the top and/or bottom side of the display surface 112.

Figure 6:
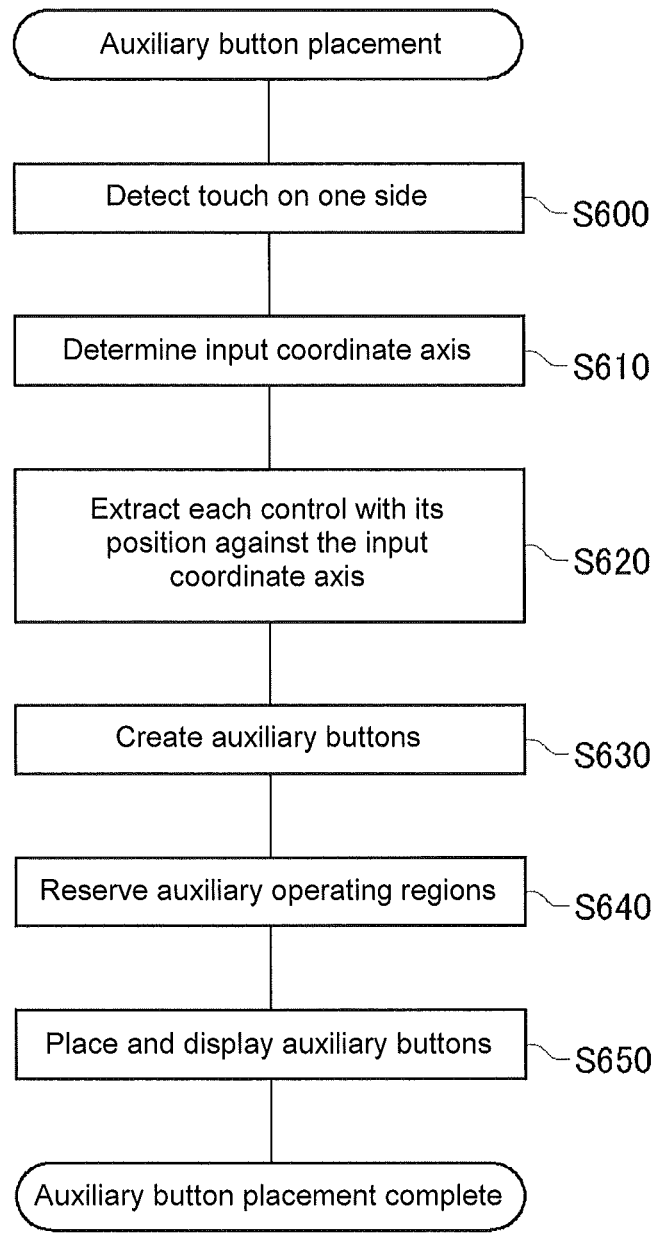
FIG. 6 shows operation flow for placement of auxiliary buttons for the first alternate example of a display device according to an embodiment.

FIG. 6 shows operation flow for placement of auxiliary buttons 118 for the first alternate example of a display device 100 according to an embodiment. Note, the overall operation flow of this alternate example is essentially the same as the operation flow of FIG. 2, and therefore a description has been omitted.

The touch panel 110 detects a touch input by the user to the edge part 114 of the display surface 112 (S600). If a touch input to the first operation point 210 is detected, the touch panel 110 transmits information for the edge part 114 that has been touch input by the user to the input controller 150.

The input controller 150 determines the input coordinate axis (S610). The input controller 150 selects the line that extends in the vertical direction on the display surface 112 and passes through the first operation point 210 to be the input coordinate axis based on the user touch inputting the edge part 114 on the top or bottom side. Alternatively, the input controller 150 selects the line that extends in the horizontal direction on the display surface 112 and passes through the first operation point 210 detected on the left or right side edge part 114 to be the input coordinate axis, based on the user touch inputting the edge part 114 on the left or right side. In an embodiment, the display controller 140 can display the display surface 112 using the input coordinate axis that was determined as an input auxiliary line.

The extracting part 130 extracts the controls 116 included in the content, together with the position with regards to the input coordinate axis. For example, the extracting part 130 extracts a control 116 that intersects with the input coordinate axis. In the example of FIG. 5, the extracting part 130 extracts the controls 116d through 116f that intersect with the input coordinate axis that extends in the vertical direction on the display surface 112 and passes through the first operation point 210, based on the touch input by the user of the first operation point 210 on the edge part 114 on the bottom side.

The display controller 140 creates auxiliary buttons 118 that correspond to the extracted controls 116 (S630). The display controller 140 creates the auxiliary buttons 118 corresponding to the controls 116 on a one-to-one basis.

The display controller 140 reserves auxiliary operating regions for placing auxiliary buttons 118 on the edge part 114 of the display surface 112 (S640). In an embodiment, the display controller 140 reserves the auxiliary operating regions on the edge parts 114 that are parallel to the input coordinate axis. For example, if the input coordinate axis is a line in the vertical direction of the display surface 112, the display controller 140 will reserve and auxiliary operating region on the right and/or left side edge part 114. In an embodiment, the display controller 140 can reserve an auxiliary operating region on either the left or right side edge part 114 whichever is closest to the input coordinate axis.

The display controller 140 places and displays the auxiliary buttons 118 on the edge parts 114 which are the reserved auxiliary operating regions (S650). In the example of FIG. 5, the display controller 140 places and displays the auxiliary buttons 118a through 118c corresponding to controls 116d through 116f on the right side edge part 114. In an embodiment, the display controller 140 can place a scroll button on the edge part 114 which has the auxiliary operating region and display along with the auxiliary buttons 118, if the extracting part 130 extracts controls 116 in a portion of the content that is not displayed on the display surface 112. In this manner, the display controller 140 completes placement of the auxiliary buttons 118 (S310).

Figure 7:
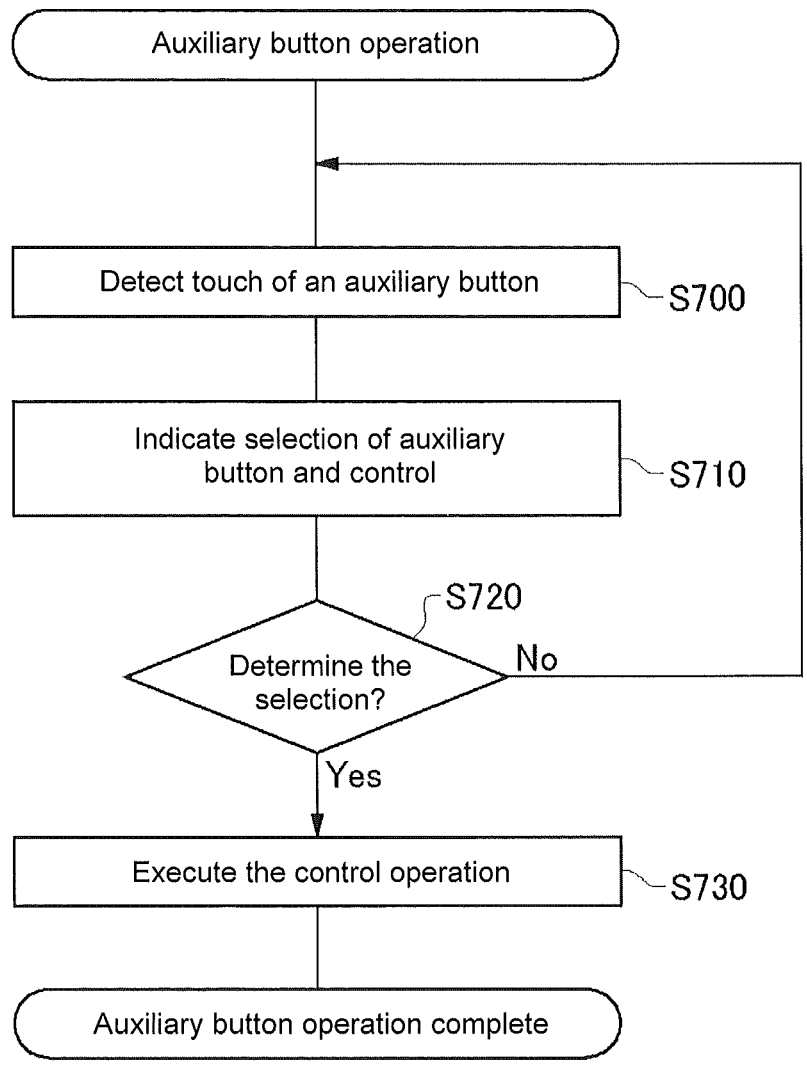
FIG. 7 shows operation flow for operation of auxiliary buttons for the first alternate example of a display device according to an embodiment.

FIG. 7 shows the operation flow for operation of auxiliary buttons 118 for the first alternate example of a display device 100 according to an embodiment. The touch panel 110 detects a touch input of the auxiliary buttons 118a through 118c by the user as a second operation point 220 (S700). If a touch input to a second operation point 220 is detected, the touch panel 110 transmits information for the auxiliary button 118 that has been touch input by the user to the input controller 150.

The input controller 150 transmits instructions to the processor 160 to indicate selection of the auxiliary button 118 and the corresponding control 116 that have been touch input by the user (S710). The processor 160 indicates selection of the auxiliary button 118 and the control 116 on the edge part 114 of the display surface 112 via a display controller 140. For example, as illustrated in FIG. 5, the display controller 140 indicates selection of the auxiliary button 118a and the corresponding control 116d based on the auxiliary button 118a that was touch input by the user as the second operation point 220.

The input controller 150 instructs the processor 116 to input control 116 based on confirmation of selecting the auxiliary button 118 by the user (S720). In an embodiment, if selection of the auxiliary button 118 is canceled by the user, the input controller 150 returns to step S700, and causes the touch input of the auxiliary button 118 by the user to be detected by the touch panel 110. The processor 160 executes the operation corresponding to the control 116 that was confirmed, and completes the operation of the auxiliary button 118 (S730).

With the display device 100 of the aforementioned alternate example of the present invention, the control 116 displayed in the center part excluding the edge parts 114 on the display surface 112 can be performed by the user operating the edge parts 114 on the display surface 112 of the touch panel 110. Furthermore, the display device according to the alternate example instructs input to the control 116 located at the row and column corresponding to the auxiliary button 118 that was operated by the user, and therefore the number of auxiliary buttons located on the edge part 114 can be less than the number of controls 116 that perform operations.

Figure 8:
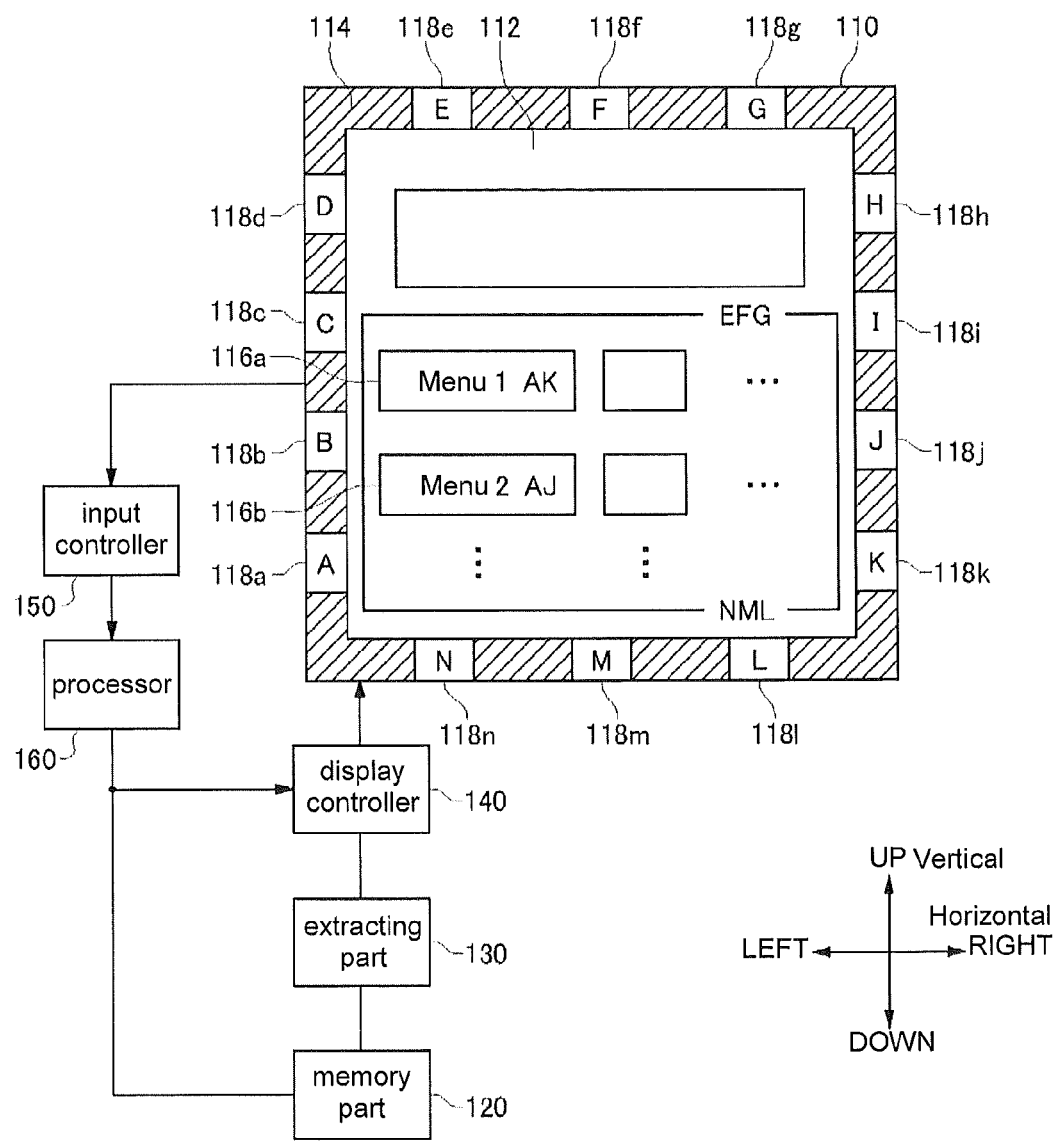
FIG. 8 illustrates a second alternate example of a display device according to an embodiment.

FIG. 8 illustrates a second alternate example of a display device 100 according to an embodiment. With a display device 100 according to an alternate example, actions that are essentially identical to the actions of the display device 100 according to the embodiment illustrated in FIG. 1 have been assigned the same code, and a description has been omitted.

With this alternate example, the display controller 140 assigns a preestablished code to the auxiliary button 118, and assigns a code set that combines a plurality of codes to the control 116. In the example illustrated in FIG. 8, the display controller 140 assigns alphabet letters A through N as codes for 14 auxiliary buttons 118 on the edge parts 114 of the display surface 112.

Furthermore, the display controller 140 assigns code sets to the controls 116 and, for example, assigns code "AK" to control 116a and code "AJ" to control 116b. In an embodiment, the display controller 140 displays the auxiliary buttons 118 on the display surface 112 together with the assigned code, and the controls 116 are displayed on the display surface 112 together with the assigned code sets.

Furthermore, the input controller 150 directs the corresponding controls 116 based on the code sets corresponding to a plurality of auxiliary buttons 118 that were operated by the user. For example, the input controller 150 instructs the processor 160 to input control 116a that has been assigned code set "AK" by the display controller 140, based on the operations of the auxiliary buttons 118a and 118k that were assigned codes "A" and "K" by the display controller 140.

Figure 9:
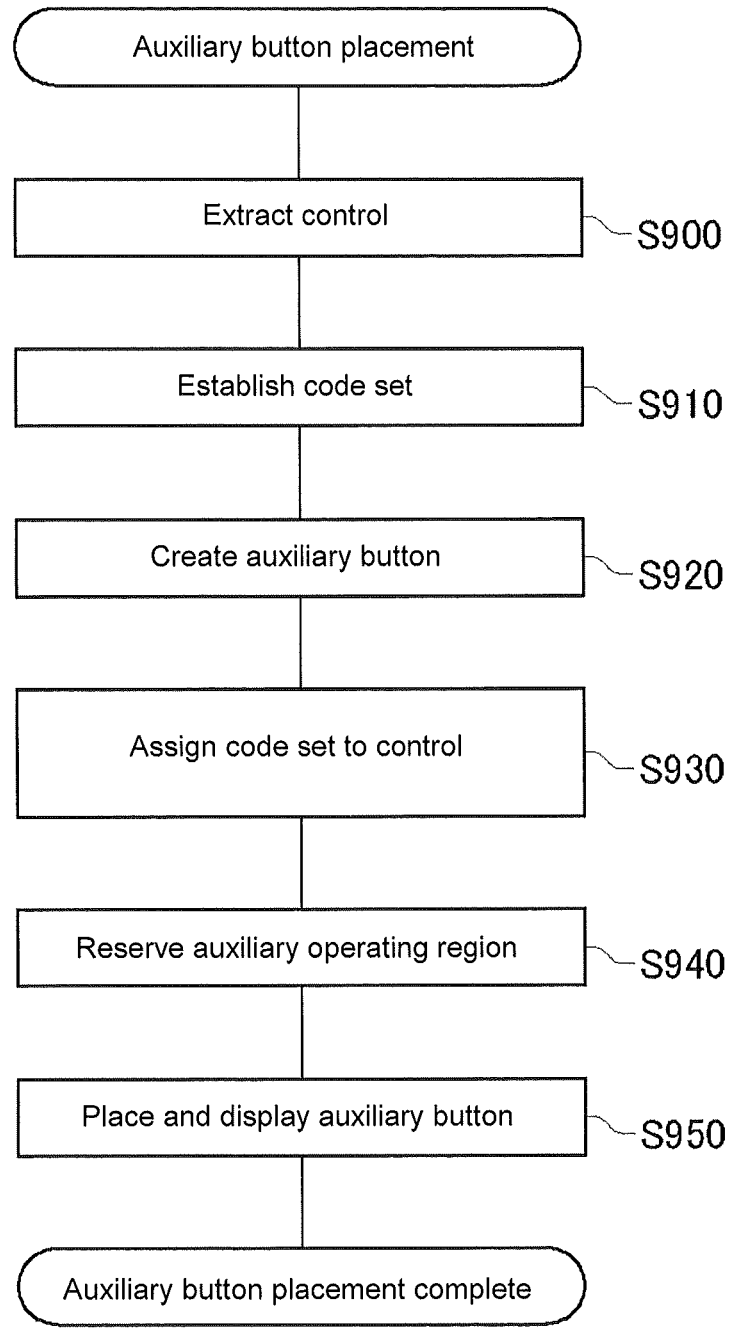
FIG. 9 shows operation flow for placement of auxiliary buttons for the second alternate example of a display device according to an embodiment.

FIG. 9 shows the operation flow for placement of auxiliary buttons 118 for the second alternate example of a display device 100 according to an embodiment. Note, the overall operation flow of this alternate example is essentially the same as the operation flow of FIG. 2, and therefore a description has been omitted.

The extracting part 130 extracts controls 116 from the content to be displayed on the display surface 112 (S900). The display controller 140 establishes code sets that correspond one-to-one to the extracted controls 116 (S910). In an embodiment, the display controller 140 can establish code set based on the number of controls 116 that are extracted and a preestablished number of auxiliary buttons 118 arranged on the edge parts 114 of the display surface 112. In an embodiment, the display controller 140 can establish the number of auxiliary buttons 118 based on user input. Alternatively. or in addition thereto, the display controller 140 may also establish a color set based on the number of controls 116 that are extracted and a preestablished number of auxiliary buttons 118 arranged on the edge parts 114 of the display surface 112.

If the number of extracted controls 116 divided by the number of auxiliary buttons 118 is n with a remainder that is not 0, for example, the display controller 140 will establish code sets that combine n+1 or fewer codes. Furthermore, if the number of extracted controls 116 divided by the number of auxiliary buttons 118 is n with a remainder that is 0 for example, the display controller 140 will establish code sets that combine n or fewer codes. For example, if the number of extracted controls 116 is 30 and the preestablished number of auxiliary buttons 118 is 14, the display controller 140 will establish code sets that combine three or fewer codes.

The display controller 140 creates auxiliary buttons 118 corresponding to the codes (S920). The display controller 140 assigns to each of the auxiliary buttons 118 a code corresponding one-to-one to each of the preestablished number of auxiliary buttons 118. Alternatively, each of the preestablished number of auxiliary buttons 118 can be pre-assigned a code that corresponds one-to-one. The display controller 140 can assign one letter in alphabetical order to each of the auxiliary buttons 118 or, alternatively, can assign a Japanese Hiragana or Katakana character in phonetic order. Alternatively, the display controller 140 can assign numbers in ascending order to the auxiliary buttons 118.

In an embodiment, if the display controller 140 establishes a color set in step S910, the display controller 140 can assign a color to each of the auxiliary buttons 118 corresponding one-to-one to each of the preestablished number of auxiliary buttons 118.

The display controller 140 assigns established code sets to the controls 116 (S930). The display controller 140 can assign code sets that combines a fewer number of codes to controls 116 with high-frequency use. In this case, the display controller 140 records the number of operations for each control 116, and updates the assignment of the code sets to the controls 116 each time the content display is updated.

In an embodiment, if the display controller 140 establishes color sets in step S910, the display controller 140 can assign established color sets to the controls 116.

For example, the display controller 140 can display established color sets in a stripe condition and display together with the controls 116. Alternatively, the display controller can change a portion of the colors for the controls 116 in a plurality of locations, so that the changed color sets and the established color sets are essentially equal.

Furthermore, the display controller 140 assigns code sets even to controls 116 that scroll the content or a portion of the content. In the example of FIG. 8, the display controller 140 assigns the code sets "EFG" and "NML" to the scroll up and scroll down controls.

The display controller 140 reserves auxiliary operating regions for placing auxiliary buttons 118 on the edge parts 114 of the display surface 112 (S940). The display controller 140 causes the auxiliary buttons 118 to be placed and displayed on the display surface 112 (S950). The display controller 140 can position the auxiliary buttons 118 in order of the codes assigned to the auxiliary buttons 118. In this manner, the display controller 140 completes placement of the auxiliary buttons 118 (S310).

Figure 10:
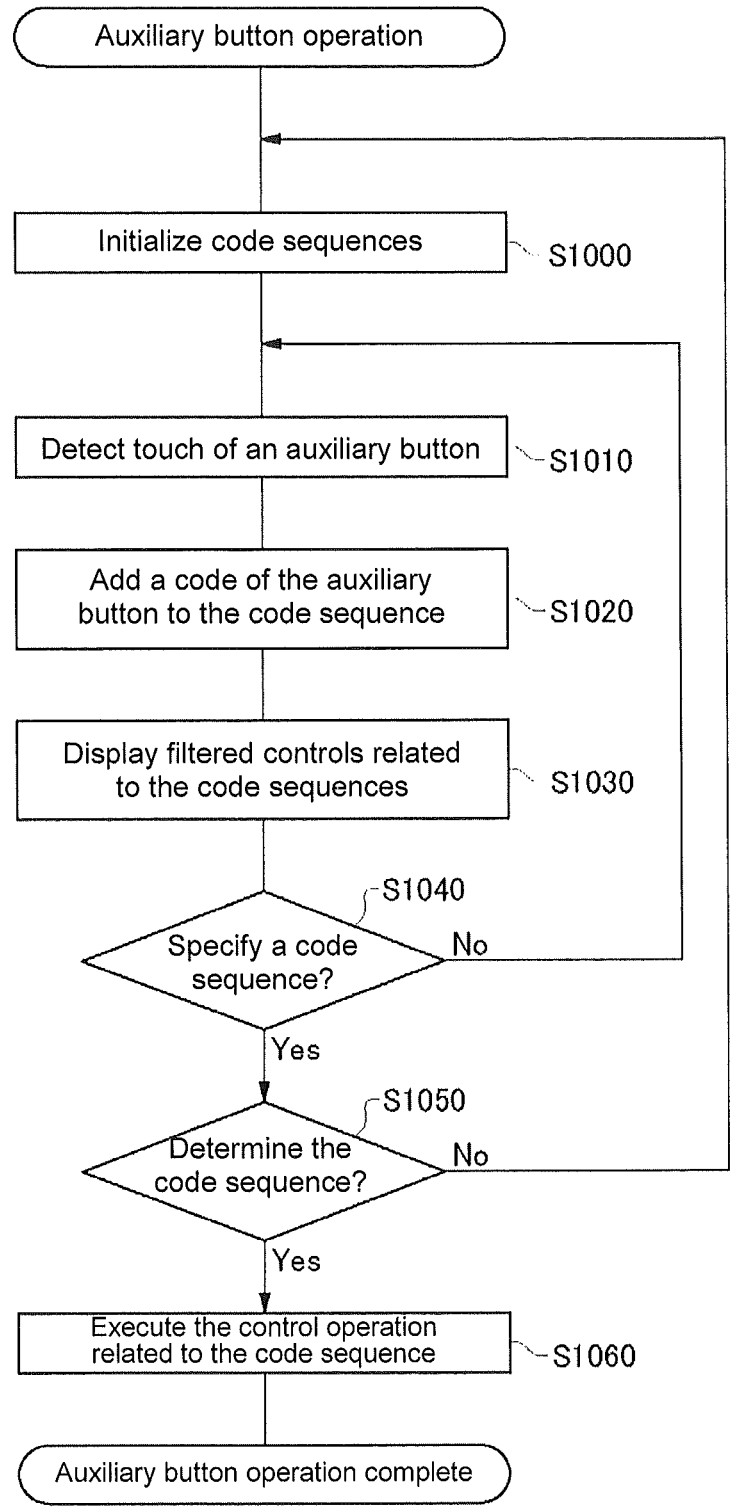
FIG. 10 shows operation flow for operation of auxiliary buttons for the second alternate example of a display device according to an embodiment.

FIG. 10 shows the operation flow for operation of auxiliary buttons 118 for the second alternate example of a display device 100 according to an embodiment. The input controller 150 initializes the memory region that temporarily stores the code sequences corresponding to user input (S1000). In an embodiment, the input control part 150 may have the memory region or, alternatively, the memory part 120 may have the memory region.

The touch panel 110 detects a touch input on the auxiliary buttons 118 by the user (S1010). If a touch input is detected, the touch panel 110 transmits information for the auxiliary button 118 that has been touch input by the user to the input controller 150.

The input controller 150 adds the code corresponding to the auxiliary button 118 that was touch input by the user to the code sequence, and stores in the memory region (S1020). The input controller 150 indicates selection of the control 116 associated with the code sequence. In an embodiment, the input controller 150 may indicate selection of the control 116 that has been assigned the same code sequence as the code sequence recorded by the input controller 150 as the control 116 associated with the control string, or may indicate selection of the control 116 that has been assigned the code sequence that matches the code sequence of the header and the code sequence recorded by the input controller 150. Furthermore, the input controller 150 may indicate selection of the control 116 that has been assigned a code sequence that matches a part of the code sequence recorded by the input controller 150.

Until a code sequence input by the user is specified, the input controller 150 returns to step S1010 and detects the touch input by the user on the auxiliary buttons 118 on the touch panel 110 (S1040). In an embodiment, if cancellation of the input of the code sequence by the user is detected when the code sequence input by the user is not specified, the input controller 150 will return to step S1000, and may detect a touch by the user to the auxiliary buttons 118 after initializing the stored code sequence. The input controller 150 can determine whether the code sequence input by the user is specified or canceled, based on the user inputting a preestablished action.

For example, if there is one control 116 associated with the code sequence, the input controller 150 selects the control 116 specified by the code sequence. Furthermore, selection confirmation or selection cancellation of the auxiliary button 118 is determined based on the touch panel 110 detecting an action such as a second touch input after removing contact with the auxiliary button 118, or continuing to touch the auxiliary button 118 for a time that is longer than a preestablished time, or by the user removing contact with the area of the auxiliary button 118 that was touched, for example.

The input controller 150 notifies the processor 160 about input of the control 116 based on the confirmation of the code sequence by the user (S1050). Furthermore, if selection of the control 116 is canceled by the user without confirming the code sequence, the input controller 150 will return to step S1000, and will cause the touch of the auxiliary button 118 by the user to be detected after initializing the code sequence that was recorded. In an embodiment, the input controller 150 can determine whether selection of the control 116 has been confirmed or selection has been canceled based on the user inputting a preestablished action.

The processor 160 executes the operation corresponding to the control 116 that was confirmed, and completes the operation of the auxiliary button 118 (S1060). With the display device 100 of the aforementioned alternate example, the controls 116 displayed in the center part excluding the edge parts 114 of the display surface 112 can be performed by the user operating the edge parts 114 of the display surface 112 of the touch panel 110. Furthermore, the display device according to the alternate example instructs input to the control 116 based on the code sequence according to a combination of a plurality of auxiliary buttons 118 operated by the user, and therefore the number of auxiliary buttons located on the edge part 114 can be less than the number of controls 116 that perform operations.

Figure 11:
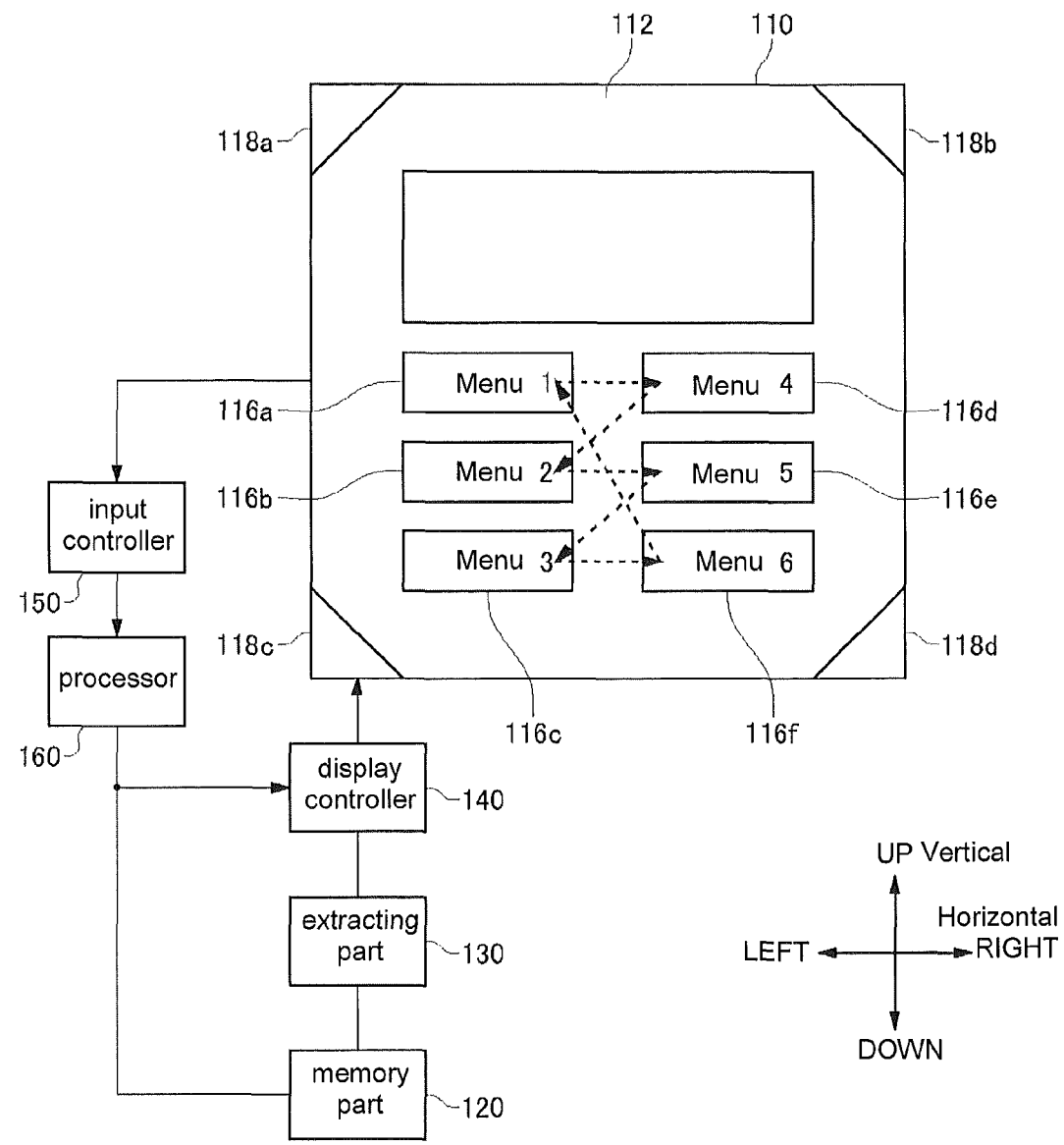
FIG. 11 illustrates a third alternate example of a display device according to an embodiment.

FIG. 11 illustrates a third alternate example of a display device 100 according to an embodiment. With a display device 100 according to the alternate example, actions that are essentially identical to the actions of the display device 100 according to the embodiment illustrated in FIG. 1 have been assigned the same code, and a description has been omitted.

In this alternate example, the input controller 150 temporarily selects one control 116 based on the operation of a first auxiliary button by the user, and subsequently changes the temporarily selected control 116 to another control 116 based on the operation of a second auxiliary button 118 by the user. Furthermore, the input controller 150 can initially temporarily select a control 116 with a preestablished positional relationship based on the position of the first auxiliary button 118 that is operated by the user.

The input controller 150 determines that the control 116 closest to the position of the first auxiliary button 118 operated by the user is the position of the control 116 that has been initially temporarily selected. With the example illustrated in FIG. 11, if the user first operates the auxiliary button 118a, the input controller 150 will initially temporarily select the control 116a. Furthermore, if the user first operates the auxiliary button 118d, the input controller 150 will first tentatively select the control 116f.

Alternatively, the input controller 150 can first tentatively select a control 116 in a preestablished position based on the first auxiliary button 118 that is operated by the user. For example, the input controller 150 will first tentatively select control 116a regardless of which auxiliary button 118 is operated first by the user. The display controller 140 displays the selection of the tentatively selected control 116.

Furthermore, the input controller 150 can determine the direction of the transition from the tentatively selected condition to another control 116, based on the position of the second auxiliary button 118 operated by the user. In the example illustrated in the diagram, the input controller 150 first tentatively selects control 116a based on the first operation of the auxiliary button 118a by the user, and transitions the tentatively selected condition to control 116d based on the second operation of the auxiliary button 118b.

Furthermore, the input controller 150 transitions the tentatively selected condition from control 116d to 116b, 116e, 116c, and then 116f in a preestablished order in the direction designated by the arrow of the dotted line in the diagram, based on the operation of the auxiliary button 118b by the user. Furthermore, the input controller 150 transitions the tentatively selected condition from control 116f to 116a, based on a subsequent operation of the auxiliary button 118b by the user. In this case, the input controller 150 can transition the selection condition in a preestablished order in a row direction that is opposite to the aforementioned direction, based on the operation of the auxiliary button 118a while the user is touching auxiliary button 118b.

Furthermore, the input controller 150 first tentatively selects control 116a based on the first operation of the auxiliary button 118a by the user, and transitions the tentatively selected condition to control 116b based on the second operation of the auxiliary button 118c. In other words, the input controller 150 transitions the tentatively selected condition from control 116a to 116b, 116c, 116d, 116e, 116f, in a preestablished order in a column direction based on the operation of the auxiliary button 118c by the user. In this case, the input controller 150 can transition the selection condition in a preestablished order in a column direction that is opposite to the aforementioned direction, based on the operation of the auxiliary button 118a while the user is touching auxiliary button 118c.

Figure 12:
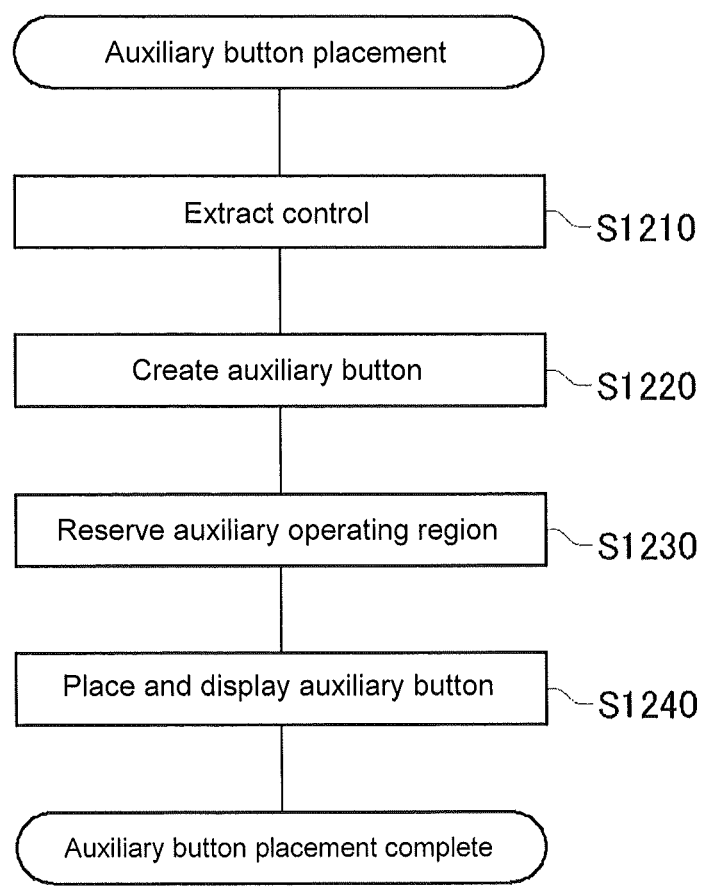
FIG. 12 shows operation flow for placement of auxiliary buttons for the third alternate example of a display device according to an embodiment.

FIG. 12 shows the operation flow for placement of auxiliary buttons 118 for the third alternate example of a display device 100 according to an embodiment. Note, the overall operation flow of this alternate example is essentially the same as the operation flow of FIG. 2, and therefore a description has been omitted.

The extracting part 130 extracts controls 116 from the content to be displayed on the display surface 112 (S1210). In an embodiment, the display controller 140 can determine the transition direction for the tentative selection of the controls 116 from the position information of the extracted controls 116. For example, the display controller 140 determines whether the transition direction is in a row direction or a column direction if the position of the control 116 is in the upper left area of the display surface 112.

The display controller 140 creates an auxiliary button 118 (S1220). The display controller 140 reserves auxiliary operating regions for placing auxiliary buttons 118 on the edge parts 114 of the display surface 112 (S1230). In an embodiment, the display controller 140 can reserve auxiliary operating regions to locate the auxiliary buttons 118 at a position that corresponds to two or more directions.

The display controller 140 creates auxiliary operating regions in the four corners of the display surface 112, for example. Alternatively, the display controller 140 can create auxiliary operating regions on the four sides of the display surface 112. In this manner, the position of the control 116 that has been tentatively selected by the user and the transition direction for the tentatively selected condition can be intuitively input by reserving auxiliary operating regions to place the auxiliary buttons 118 in four locations corresponding to four directions. The display controller 140 places and displays the auxiliary buttons 118 on the display surface 112 and completes placement of the auxiliary buttons 118 (S1240).

Figure 13:
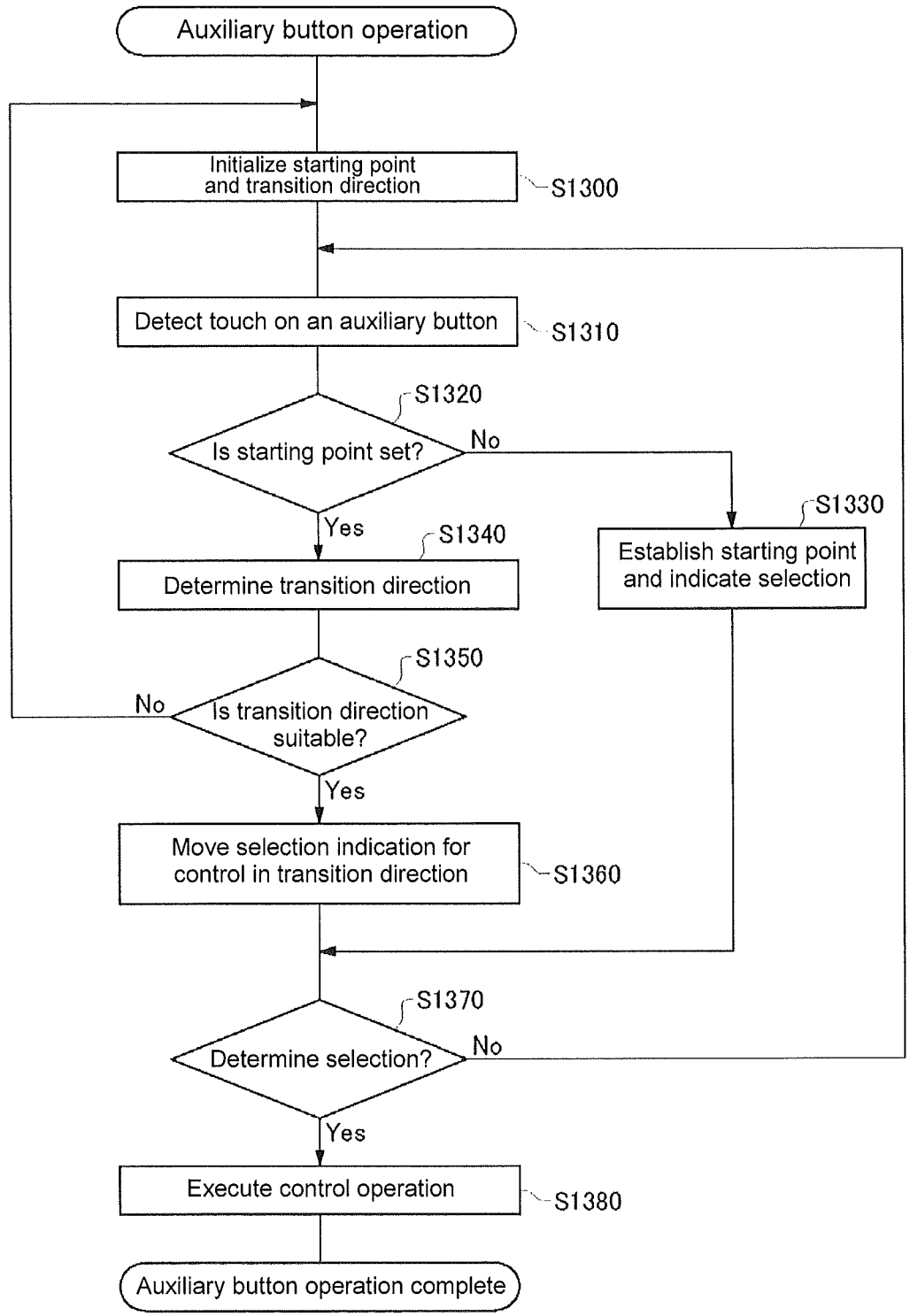
FIG. 13 shows operation flow for operation of auxiliary buttons for the third alternate example of a display device according to an embodiment.

FIG. 13 shows the operation flow for operation of auxiliary buttons 118 for the third alternate example of a display device 100 according to an embodiment. The input controller 150 initializes the memory region that temporarily stores the starting position and the direction of transition of the tentatively selected condition (S1300). In an embodiment, the input control part 150 may have the memory region, or alternatively a memory part 120 may have the memory region.

The touch panel 110 detects touch input of the auxiliary buttons 118 by the user (S1310). If a touch input is detected, the touch panel 110 transmits information for the auxiliary button 118 that has been touch input by the user to the input controller 150.

The input controller 150 determines whether or not a starting point for the tentatively selected condition has been established (S1320). If the memory region that stores the starting point for the tentatively selected condition is initialized, for example, the input controller 150 will determine that a starting point for the tentatively selected condition has not been established. In this case, the input controller 150 establishes the auxiliary button 118 that was touch input by the user as the first auxiliary button 118, and indicates selection of the control 116 together with the establishment of the corresponding control 116 as the starting point for the tentatively selected condition.

If the memory region that stores the starting point for the tentatively selected condition has not been initialized, for example, the input controller 150 will determine that a starting point for the tentatively selected condition is established. In this case, the input controller 150 establishes the auxiliary button 118 that was touch input by the user as the second auxiliary button 118, and determines the corresponding transition direction of the tentatively selected condition (S1340).

In an embodiment, the input controller 150 determines whether or not the transition direction corresponding to the input of the second auxiliary button 118 is appropriate (S1350). For example, an example is described where if a second auxiliary button 118b is input with regards to the first auxiliary button 118a, the input controller 150 will transition the tentatively selected condition in a preestablished transition direction, but if the second auxiliary button 118c is input, the transition is set to move in the opposite direction as the preestablished transition direction.

In this case, the input controller 150 determines that an appropriate transition direction has not been input if auxiliary button 118d is input as the second operation, the process returns to step S1300, the starting point and the transition direction of the tentatively selected condition are initialized, and the first auxiliary button 118 is input. Furthermore, if auxiliary button 118b or auxiliary button 118c is input as the second operation, the input controller 150 will determine that an appropriate transition direction has been input, and the transition display of the corresponding control 116 will move in the transition direction (S1360).

In an embodiment, the input controller 150 may transmit instructions to the processor 160 to scroll the contents displayed on the display surface 115 based on the touch panel 110 detecting a third operation by the user in a condition where the control 116 is selected. For example, if the touch panel 110 detects that the touched area will be moved on the touch panel 110 after the user has touch input an edge part where an auxiliary button 118 is not located, the input controller 150 determines that the user has input a third operation. In an embodiment, the user may move the touched area on the touch panel 110 in the direction that the contents are to be scrolled. Thereby, the display device 100 can scroll the contents based on user input, and display the controls 116 located on a portion of the contents that are not displayed on the display surface 112, and thereby the controls 116 can be selected.

The input controller 150 instructs the processor 160 to input controls 116 based on confirmation of the selection of the control 116 by the user (S1370). Herein, if selection of the control 116 is canceled by the user, the input controller 150 returns to step S1310, and causes the touch input of the auxiliary button 118 by the user to be detected by the touch panel 110. The processor 160 executes the operation corresponding to the control 116 that was determined, and completes the operation of the auxiliary buttons 118 (S1380).

With the display device 100 of the aforementioned alternate example, the controls 116 displayed in the center part excluding the edge parts 114 on the display surface 112 can be performed by the user by operating the edge parts 114 on the display surface 112 of the touch panel 110. Furthermore, the display device 100 according to the alternate example determines the control 116 with the tentatively selected condition and the direction for transitioning to another control 116 based on the operation by the user, and therefore the number of auxiliary buttons 118 placed on the edge parts 114 can be reduced below the number of controls 116 to be operated.

Figure 14:
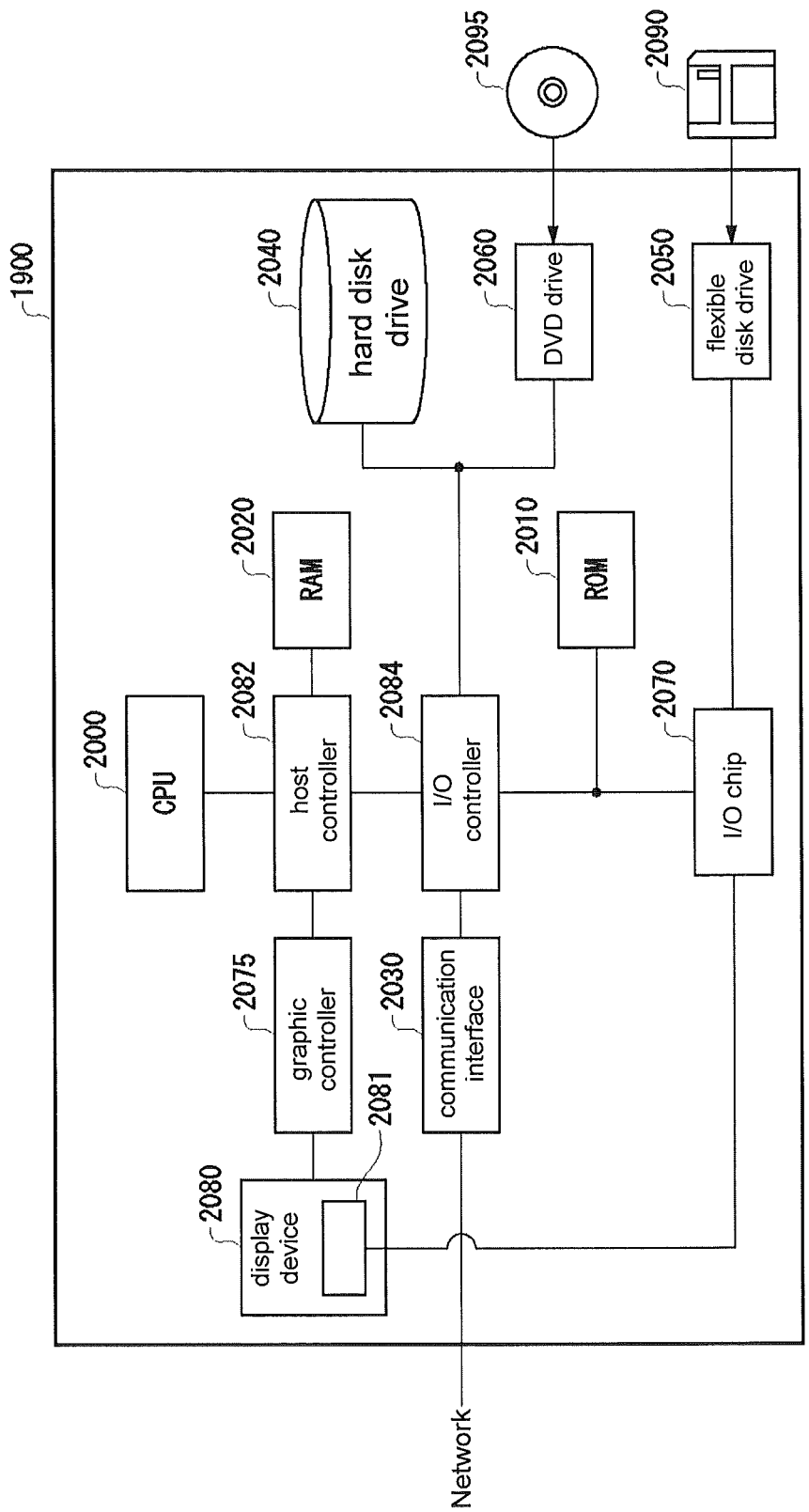
FIG. 14 illustrates an example of a hardware configuration for a computer.

FIG. 14 illustrates an example of a hardware configuration for a computer 1900. The computer 1900 according to an embodiment has a CPU periphery part with a CPU 2000, RAM 2020, graphic controller 2075, and display device 2080, mutually connected by a host controller 2082, and input output part with a communication interface 2030, hard disk drive 2040, and DVD drive 2060, connected to the host controller 2082 by an I/O controller 2084, and a legacy input output part with ROM 2010, flexible disk drive 2050, and I/O chip 2070 connected to the I/O controller 2084.

The host controller 2082 connects the RAM 2020, the CPU 2000 that accesses the RAM 2020 at a high transfer rate, and the graphic controller 2075. The CPU 2000 operates and controls the various parts based on a program that is stored in the ROM 2010 and the RAM 2020. The graphic controller 2075 acquires image data generated in a frame buffer provided in the RAM 2020 and displays the image on the display device 2080. Alternatively, the graphic controller 2075 may internally include a frame buffer that stores image data to be reproduced by the CPU 2000 or the like.

The I/O controller 2084 connects the host controller 2082, the communication interface 2030 which is a relatively high-speed input output device, the hard disk drive 2040, and the DVD drive 2060. The communication interface 2030 communicates with other devices through a network. The hard disk drive 2040 stores data and programs to be used by the CPU 2000 in the computer 1900. The DVD drive 2060 reads data or programs from a DVD-ROM 2095 and provides the data or program to the hard disk drive 2040 via the RAM 2020.

Furthermore, the I/O controller 2084 is connected to the ROM 2010, flexible disk drive 2050, and an input output device with a relatively low-speed I/O chip 2070. The ROM 2010 stores a boot program that is executed when starting the computer 1900, and/or programs or the like that depend on the hardware of the computer 1900. The flexible disk drive 2050 reads the program or data from a flexible disk 2090, and provides the program or data to the hard disk drive 2040 via the RAM 2020. The I/O chip 2070 connects the touch position detecting part 2081 and the flexible disk drive 2050 to the I/O controller 2084, and also connects various types of input output devices to the I/O controller 2084 via a parallel port, serial port, keyboard port, mouse port, or the like. Herein, if an acceleration detector that detects acceleration is used as the input output device, the I/O chip 2070 is connected to the acceleration detecting part, and the acceleration detecting part is connected to the I/O controller 2084.

The program provided to the hard disk drive 2040 via the RAM 2020 is provided by a user and stored on a recording medium such as a flexible disk 2090, DVD-ROM 2095, or IC card or the like. The program is read from the recording medium, installed into the hard disk drive 2040 in the computer 1900 via the RAM 2020, and executed in the CPU 2000.

The program is installed in the computer 1900, and the computer 1900 functions as the display device 100. In an embodiment, the touch panel 110 is the display device 2080 with a touch position detecting part 2081 such as a touch sensor or the like. The touch position detecting part 2081 is connected to an I/O chip 2070.

Information processing described in the program functions as the display device 100 which is a specific means that collaborates with the software and the aforementioned various types of hardware resources, by being read by the computer 1900. Furthermore, a unique touch panel 110 corresponding to the objective of use, the memory part 120, the extracting part 130, the display controller 140, the input controller 150, and the processor 160 are formed by calculating and/or processing information based on the objective of use of the computer 1900 in the embodiment, using the specific means.

As an example, when communication is performed between the computer 1900 and an external device or the like, the CPU 2000 executes a communication program loaded onto the RAM 2020, and communication processing instructions are provided to the communication interface 2030 based on the processing details recorded in the communication program. The communication interface 2030 is controlled by the CPU 2000, reads transmission data stored in the transfer buffer region or the like provided on a storage device such as the RAM 2020, hard disk drive 2040, flexible disk 2090, or DVD-ROM 2095 and transmits to a network, or writes the reception data received from the network to a reception buffer region or the like provided on the storage device. In this manner, the communication interface 2030 can transfer transmission data to a memory device using a DMA (direct memory access) method, or alternatively, the CPU 2000 reads data from the communication interface or the memory device transmission source and then forwards the transmission data by writing the data to the storage device or to the communication interface 2030 of the forwarding destination.

Furthermore, the CPU 2000 reads all or the necessary parts of the file or database or the like stored in an external storage device such as a hard disk drive 2040, DVD drive 2060 (DVD-ROM 2095), flexible disk drive 2050 (flexible disk 2090) and the like, on to the RAM 2020 using DMA transfer or the like, and performs various types of processes on the data on the RAM 2020. Furthermore, the CPU 2000 writes back the processed data to the external storage device using DMA transfer or the like. During this type of processing, the RAM 2020 temporarily holds the content of an external storage device, and therefore with the embodiment, the RAM 2020 and the external storage device and the like are generally referred to as memory, memory part, or memory device or the like. The various types of information such as the various programs, data, tables, databases, and the like in the embodiments are stored in this type of memory device, and are subject to information processing. Note, the CPU 2000 maintains a portion of the RAM 2020 on the cache memory, and can perform reading and writing onto the cache memory. Under this condition, the cache memory performs a part of the function of the RAM 2020, so in the embodiments of the present invention, unless otherwise expressly distinguished, the cache memory is included by the RAM 2020, memory, and/or memory devices.

Furthermore, the CPU 2000 performs various types of processes including the various types of calculations, information processing, condition determination, information searching and replacing, and the like that are included in the embodiment the present invention and specified by a command sequence of a program with regards to the data that was read from the RAM 2020, and the CPU 2000 also writes back to RAM 2020. For example, when determining conditions, the CPU 2000 compares various types of variables described in the embodiments to other variables or constants, and determines whether conditions such as greater, less, greater or equal, less or equal, or equal to, or the like are satisfied, and if the conditions are satisfied or if not satisfied, the CPU 2000 branches to a different command string or calls out a subroutine.

Furthermore, the CPU 2000 can search for information that is stored in a file or database or the like in the memory device. For example, for the case a plurality of entries associated with an attribute value of a second attribute with regards to the attribute value of a first attribute are stored in a memory device, the CPU 2000 searches for an entry that matches the conditions specified by the attribute value of the first attribute from the plurality of entries stored in the memory device, and reads the attribute value of the second attribute that is stored in the entry, and thereby the attribute value of the second attribute that is associated with the first attribute that satisfies predetermined conditions can be obtained.

The aforementioned programs or modules can also be stored on an external recording medium. The recording medium can be a flexible disk 2090, DVD-ROM 2095, as well as an optical recording medium such as a DVD or CD or the like, optical magnetic recording medium such as MO, tape medium, semiconductor memory such as an IC card, or the like. Furthermore, a memory device such as a hard disk or RAM provided on a server system that is connected to a dedicated communication network or the Internet can be used as the recording medium, and the program can be provided to the computer 1900 through the network.

The present invention was described above using an embodiment, but the technical scope of the present invention is not restricted to the scope disclosed in the aforementioned embodiments. It is understood by one skilled in the art that various modifications and improvements to the aforementioned embodiments are possible. Embodiments with these changes or improvements are included in the technical scope of the present invention, and are obvious from the scope of the patent claims.

It should be noted that the execution procedures for the various processes such as the actions, procedures, steps, and stages in the devices, systems, programs, and methods disclosed in the patent claims, specification, and drawings are not shown in a specific order or priority, and can be performed in any order unless the output of a previous process is used in a subsequent process. With regards to the operation flow in the claims, specification, and drawings, even though descriptions are made using the terms "first", and "next", and the like for convenience, this does not mean that the actions must be performed in this order.

What is claimed is:

1. A display device, comprising:
   a touch panel that displays a screen on a display surface and inputs a user operation point on the display surface;
   an extracting part that extracts controls that receive a touch operation of a user from content to be displayed on the display surface, wherein auxiliary buttons are created responsive to extraction of the controls; and
   a display controller that displays the auxiliary buttons on edge parts of the display surface and provides instructions for input of an extracted one of the controls, together with the content, on the display surface;
   wherein the display controller displays the controls on non-edge parts of the same display surface, the display device further comprising:
   an input controller that provides instruction for inputting a corresponding control based on the user operating the auxiliary buttons;
   wherein the extracting part extracts row and column position information of the controls on the display surface;
   the display controller places the auxiliary buttons in a horizontal direction and a vertical direction of the display surface based on the row and column position information of the controls; and
   the input controller provides instructions for inputting the control located at an intersecting point of a row and column corresponding to the auxiliary buttons operated by the user.

2. The display device according to claim 1, wherein the display controller displays the auxiliary buttons on the edge parts of the display surface at a predetermined size and a predetermined distance apart from each other and the controls.

3. The display device according to claim 1, wherein the display controller displays a plurality of the auxiliary buttons in a color that is the same as a color displayed on the display surface for the corresponding controls.

4. The display device according to claim 1, wherein the input controller:
   causes one of the controls to be in a tentatively selected condition based on operation of a first auxiliary button by the user; and
   transitions the tentatively selected condition of the control to another successive control based on operation of a second auxiliary button by the user.

5. The display device according to claim 1, wherein the display controller places the auxiliary buttons at positions on the display surface that are more than a predetermined distance from a display position of a plurality of the controls on the same display surface.

6. The display device according to claim 1, wherein the touch panel invalidates input from the user for controls on the display surface having corresponding auxiliary buttons that are placed on the edge parts of the display surface.

7. The display device according to claim 1, wherein the extracting part is prevented from extracting controls that are placed on the edge parts of the display surface.

8. The display device according to claim 1, wherein the extracting part extracts the controls from image information of the content.

9. The display device according to claim 1, wherein the extracting part extracts the controls from source code of the content.

10. The display device according to claim 1, wherein the extracting part receives information for the controls from an application that displays the content.

11. The display device according to claim 1, wherein the display controller displays a line on the display surface that connects between the auxiliary button and corresponding control based on touch input by the user of the auxiliary button.

12. The display device according to claim 1, wherein a set of the auxiliary buttons shares a one-to-one correspondence with a corresponding control based on the intersecting point, the intersecting point defined by the row and column position information.

13. A display device, comprising:
    a touch panel with a display surface; and
    a display controller that displays controls and auxiliary buttons on the display surface, the auxiliary buttons call out functions that are the same as functions of the controls, the auxiliary buttons displayed on edge parts of the display surface, wherein the auxiliary buttons are created responsive to extraction of the controls;
    wherein the display controller displays the controls on non-edge parts of the same display surface;
    an input controller that provides instruction for inputting a corresponding control based on a user operating the auxiliary buttons; and
    an extracting part that extracts row and column position information of the controls on the display surface;
    wherein the display controller places the auxiliary buttons in a horizontal direction and a vertical direction of the display surface based on the row and column position information of the controls; and
    the input controller provides instructions for inputting the control located at an intersecting point of a row and column corresponding to the auxiliary buttons operated by the user.

14. A display method, comprising:
    displaying content on a display surface;
    inputting user operation points on the display surface;
    extracting controls that receive touch operations of a user from the content to be displayed on the display surface, wherein auxiliary buttons are created responsive to extraction of the controls; and displaying the auxiliary buttons on edge parts of the display surface and providing instructions for input to an extracted control, together with the content on the display surface;

displaying the controls on non-edge parts of the display surface;

providing instruction for inputting a corresponding control based on the user operating the auxiliary buttons;

extracting row and column position information of the controls on the display surface;

placing the auxiliary buttons in a horizontal direction and a vertical direction of the display surface based on the row and column position information of the controls; and providing instructions for inputting the control located at an intersecting point of a row and column corresponding to the auxiliary buttons operated by the user.

15. The display method according to claim 14, further comprising displaying the auxiliary buttons on the edge parts of the display surface at a predetermined size and a predetermined distance apart from each other and the controls.

16. A computer program product comprising a computer readable storage medium having computer readable program code embodied therewith, the computer readable program code, which when executed by a computer processor, causes the computer processor to perform a method, the method comprising:

displaying content on a display surface of a display device;

inputting user operation points on the display surface;

extracting controls that receive touch operations of a user from the content to be displayed on the display surface, wherein auxiliary buttons are created responsive to extraction of the controls; and displaying the auxiliary buttons on edge parts of the display surface and providing instructions for input to an extracted control, together with the content on the display surface;

displaying the controls on non-edge parts of the display surface;

providings instruction for inputting a corresponding control based on the user operating the auxiliary buttons;

extracting row and column position information of the controls on the display surface;

placing the auxiliary buttons in a horizontal direction and a vertical direction of the display surface based on the row and column position information of the controls; and providing instructions for inputting the control located at an intersecting point of a row and column corresponding to the auxiliary buttons operated by the user.

17. The display device according to claim 1, wherein the extraction of the controls includes extracting information of the controls including a type, label, size, and position of the controls, wherein the extracting part sends the information to the display controller.

* * * * *